(12) United States Patent
Lettington (10) Patent No.: US 7,106,482 B2
(45) Date of Patent: Sep. 12, 2006

(54) SCANNING APPARATUS

(75) Inventor: Alan Lettington, Reading (GB)

(73) Assignee: Gestion Avanzada de Technologias Electronicas, Gate S.A., Madrid (ES)

( * ) Notice: Subject to any disclaimer, the term of this patent is extended or adjusted under 35 U.S.C. 154(b) by 0 days.

(21) Appl. No.: 11/367,554

(22) Filed: Mar. 6, 2006

(65) Prior Publication Data

US 2006/0146387 A1    Jul. 6, 2006

Related U.S. Application Data

(62) Division of application No. 10/484,173, filed as application No. PCT/GB02/03349 on Jul. 22, 2002, now Pat. No. 7,038,821.

(30) Foreign Application Priority Data

Jul. 20, 2001    (GB) .................................. 0117750.0

(51) Int. Cl.
*G02B 26/08*    (2006.01)
(52) U.S. Cl. ....................................... 359/203; 359/211
(58) Field of Classification Search ................ 359/198, 359/200, 201, 203, 211
See application file for complete search history.

(56) References Cited

U.S. PATENT DOCUMENTS 3,881,802 A * 5/1975 Helava ........................ 359/211
4,544,228 A * 10/1985 Rando ........................ 359/211

* cited by examiner

*Primary Examiner*—Mark A. Robinson
(74) *Attorney, Agent, or Firm*—Stites & Harbison PLLC; Ross F. Hunt, Jr.

(57) ABSTRACT

A scanning apparatus comprises two rotatable bodies (1,10 or 40) arranged to rotate in opposite directions. The first body being a polarizer (10) and the second being a mirror (1) or a second polarizer (40). The apparatus is arranged to define an optical path for a polarized beam, wherein the optical path passes through the first body (10), is reflected at the second body (1 or 40), and is reflected by the first body (10) back to the second body (1 or 40) from where it is transmitted or reflected to produce a linear scan. There is also disclosed a scanning system comprising a reflector (1) and an optical wedge (42) containing refractive materials, arranged to counter rotate and arranged so that a beam passing through the optical wedge (42), is reflected by the reflector (1) and passes back through the optical wedge (42) to produce a linear scan.

4 Claims, 7 Drawing Sheets

SCANNING APPARATUS

CROSS REFERENCE TO RELATED APPLICATIONS

This application is a divisional of U.S. application Ser. No. 10/484,173, filed Jul. 6, 2004 now U.S. Pat. No. 7,038,821, which is a 371 of PCT/GB02/03349 filed Jul. 22, 2002 (which is hereby incorporated by reference).

BACKGROUND OF THE INVENTION

Field of the Invention

The present invention relates to a scanning apparatus which may be used in a real-time imaging system, and in particular in a real-time mm wave length, or microwave imaging system.

SUMMARY OF THE PRIOR ART

In optics, there is a requirement to scan beams rapidly across the scene in a linear scan pattern.

For visible light, it is known to achieve a linear scan pattern by the use of two circular rotating reflective discs, which are equally inclined to their axes of rotation, and which rotate at the same speed. A single rotating mirror would produce a conical scan. However, when the second rotating mirror receives a conical scan from the first rotating mirror parts of the conical scan are effectively cancelled out resulting in a linear scan pattern. Alternatively flapping mirrors may be used to achieve a linear scan pattern.

Such methods are suitable in the visible region where the apertures involved are small. In the infra-red region apertures are frequently about 100 mm and focusing lenses are used to reduce this aperture to around 10 mm. In the mm-wave and microwave regions these apertures are very large (in the order of 1 m) and it is not practical to use flapping mirrors. Also when making reflective discs, there is considerable displacement of the beam which is received by the second of the mirrors, and therefore the second mirror has to be very large so as to be able to receive the displaced beam.

It is also known, for visible light, to produce a linear scan using two counter rotating prisms. However, such prisms are heavy and therefore not suitable for large aperture systems.

SUMMARY OF THE INVENTION

The present invention aims to provide a system for producing linear scans which is of suitable size and weight to be used in mm wave length and microwave applications. In other words the invention aims to provide a system which performs the function of the flapping mirrors, in effectively converting conical to linear scans.

In general terms, the invention uses at least one rotating polarizer which, depending on the point in the optical path of the beam transmits and reflects the beam, so that the beam can pass through the polarizer but then be reflected from another body back to the polarizer to be reflected therefrom to cause cancellation of conical scans to produce a linear scan by a double reflection arrangement similar to that described previously.

According to a first aspect, the invention may then provide a scanning apparatus comprising an optical system having first and second rotatable bodies arranged to rotate at the same speed, in opposite directions, having generally parallel axes of rotation and being inclined to those axes of rotation, the optical systems being arranged to define an optical path for a polarized beam so as to form a linear scan, wherein at least a first one of the bodies is a polarizer and the optical system is such that the optical path passes through the polarizer, is reflected at the second body, and is reflected by the polarizer back to the second body. Preferably the axes are coincident.

There are two general possibilities. In the first possibility, the second body is a mirror, or other reflective disc. In this case the optical path is such that, after the optical path has been reflected by the polarizer back to the second body, the second body reflects the beam back through the polarizer.

In the second possibility, the second body is a polarizer and the optical path is such that once the beam is reflected back to the second body it is transmitted through the second body. This is a transmission system, with the beam finally passing through the rotatable body, and emerging from the rotatable body in direction in which it was received.

The polarizer may be a circular polarizer, or may be a linear polarizer.

The invention relies upon changes in the orientation of polarization which affects whether or not the beam passes through, or is reflected by the polarizer. Reflection is one possible way of altering the orientation of polarization. However, it may be necessary to include in the optical system quarter wave plates or Faraday rotators to alter the orientation of polarization. This is particularly the case when linear polarizers are used.

For example the first body may be a linear polarizer, and two rotatable quarter wave plates may be located on either side of the polarizer. The quarter wave plates rotate about the same axis as the linear polarizer, at the same speed and in the same direction as the linear polarizer.

In an alternative, a rotatable quarter wave plate is located on one side of the linear polarizer, being rotatable about the same axis as the polarizer, at the same speed and in the same direction, and a Faraday rotator is located on the other side of the polarizer. The Faraday rotator may be fixed or rotatable.

The quarter wave plate(s) and linear polarizer are preferably connected to form a rotating unit.

The apparatus may have a fixed quarter wave plate to convert linear polarized radiation into circular polarized radiation before it is received by the first body.

Preferably angle of inclination of the first body is twice the angle of inclination of the second body.

Linear scans may also be achieved by using a rotatable reflector and an optical wedge, wherein the wedge includes refractive materials. The wedge and the reflector are arranged so that their conical scan patterns are the same, but in opposite directions, to produce a linear scan pattern. To achieve this, the wedge and the reflector are arranged to counter-rotate about generally parallel axes, and the reflector is inclined to its axis of rotation, as are the faces of the wedge.

With such an arrangement, a beam passes through the wedge, is reflected by the reflector and passes back through the wedge.

Preferably, the axes of rotation of the wedge and the reflector are coincident, and the median plane of the wedge is preferably generally perpendicular to the axis of rotation.

The wedge may be wholly of refractive material, such as silica, but preferably has refractive plates supported on a refractive core. Refractive material, such as sulphur, may be sandwiched between the plates and the core.

BRIEF DESCRIPTION OF THE DRAWINGS

Embodiments of the invention will now be described in detail, by way of example only, and with reference to the following drawings, in which.

DESCRIPTION OF THE PREFERRED EMBODIMENTS

Figure 1:
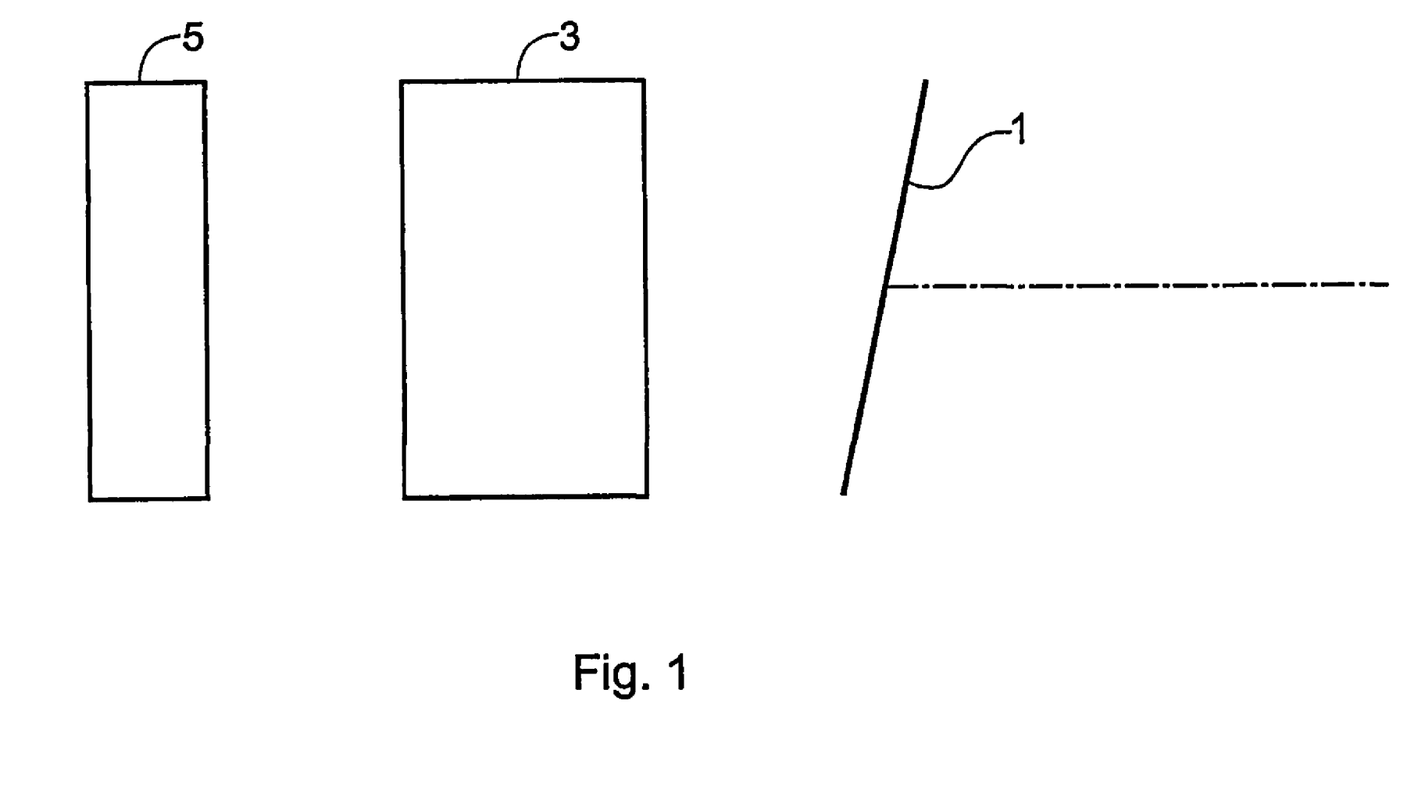
FIG. 1 shows an apparatus according to a first embodiment of the invention.

Referring first to FIG. 1 a rotating mirror 1 is inclined at around 11° and a rotating unit 3, (shown in more detail in FIG. 2) which includes a linear polarizer inclined at an angle of around 22°. A fixed quarter wave plate 5 is located in front of the rotating unit 3 to convert a linearly polarized beam to a circularly polarized beam.

Figure 2:
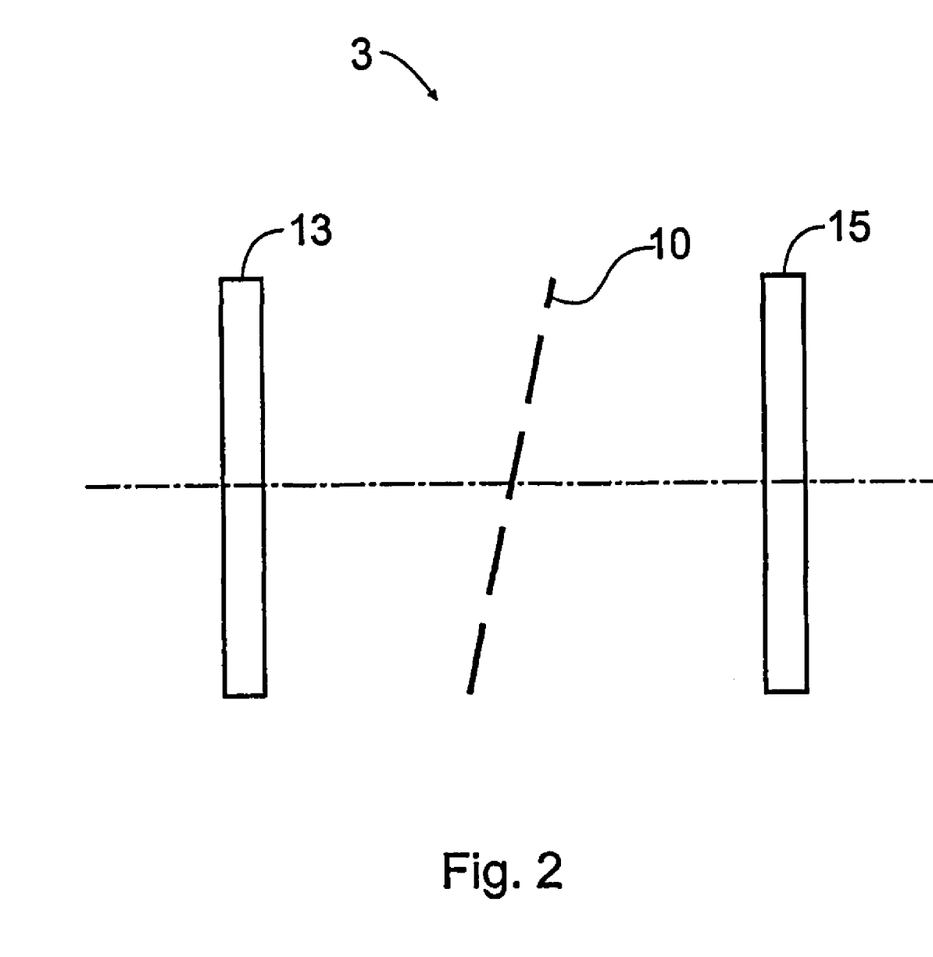
FIG. 2 shows in detail a rotating unit according to an embodiment of the invention.

FIG. 2 shows the rotating unit 3 in detail. This comprises an inclined linear polarizer 10 positioned between two quarter wave plates 13 and 15. The quarter wave plates in this embodiment have fast axes of +45°, though other directions are possible.

A linearly polarized beam is converted by the fixed quarter wave plate 5 to a right circularly polarized beam In this embodiment, the incident beam is horizontally polarized and the fixed quarter wave plate 5, which has a fast axis at +45° produces right-handed circularly polarized beam. Though other directions are possible, for example, left circularly polarized beam may alternatively be used).

Figure 3:
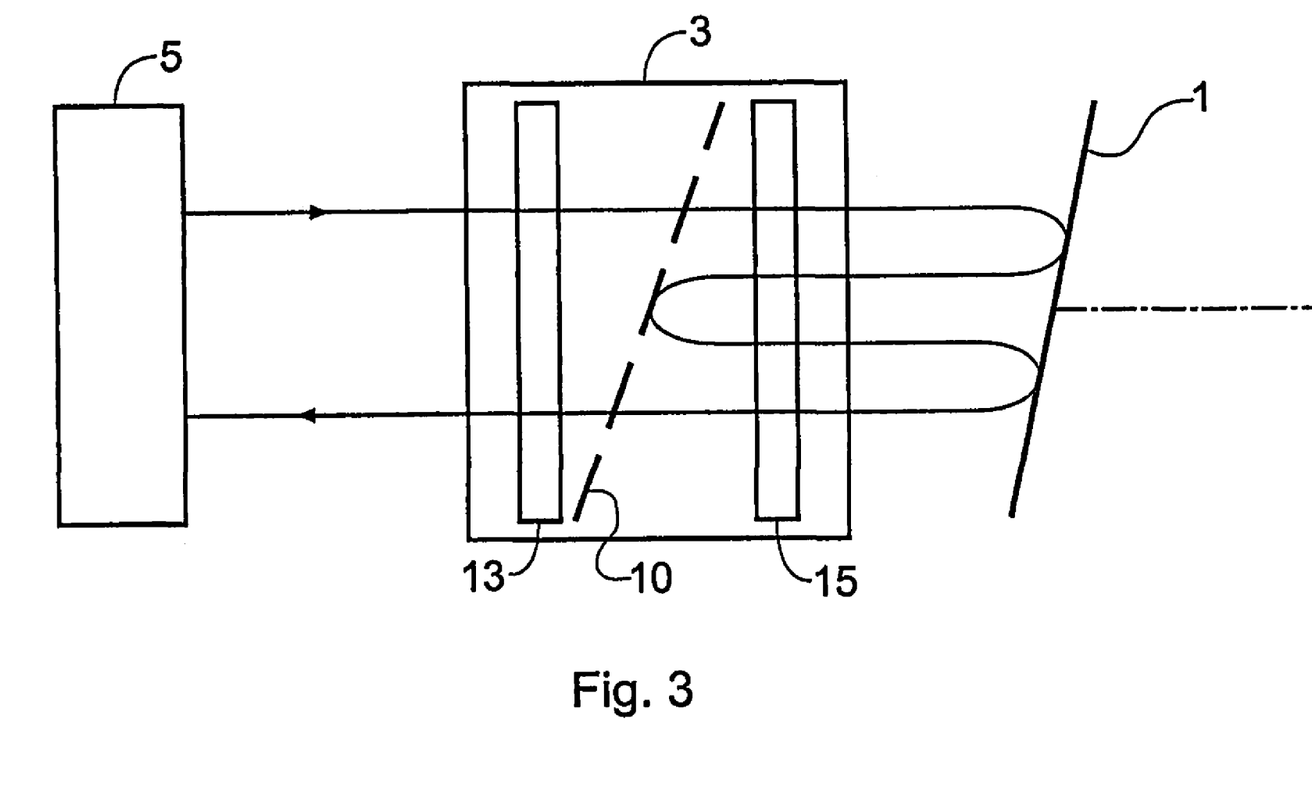
FIG. 3 shows the path of the beam through the apparatus shown in FIG. 1 and FIG. 2.

Referring to FIG. 3, the right circularly polarized beam passes through the first quarter wave plate 13 of rotating unit 3 which converts the beam to linear polarized. The beam then passes through the polarizer 10 and through the second quarter wave plate 15 of the rotating unit, where it is converted to circular polarized light. The beam then reaches the rotating mirror 1, which rotates in the opposite direction from rotating unit 3 but at the same speed, and the beam is reflected from the counter-rotating mirror 1.

The beam then passes back to the rotating unit 3 where it passes through the quarter wave plate 15. This time the light is reflected at the inclined polarizer 10, because the plane of polarization has been rotated through 90° when reflected at the rotating mirror 1 and transmitted by the quarter wave plate 15. The beam then passes to the counter rotating mirror 1 where it is reflected again, the handedness of the circularly polarized radiation undergoing a further change, and passes back through the rotating unit 3, this time passing through the linear polarizer 10.

In isolation, the rotating unit 3 and the counter rotating mirror 1 produce conical scans, but in this tandem arrangement, with the rotations at the same speed and in opposite directions. Parts of the conical scans are effectively cancelled out to produce a linear scan. This cancellation is virtually complete if the inclination of the inclined polarizer 10 is twice that of the counter-rotating mirror 1.

Figure 4:
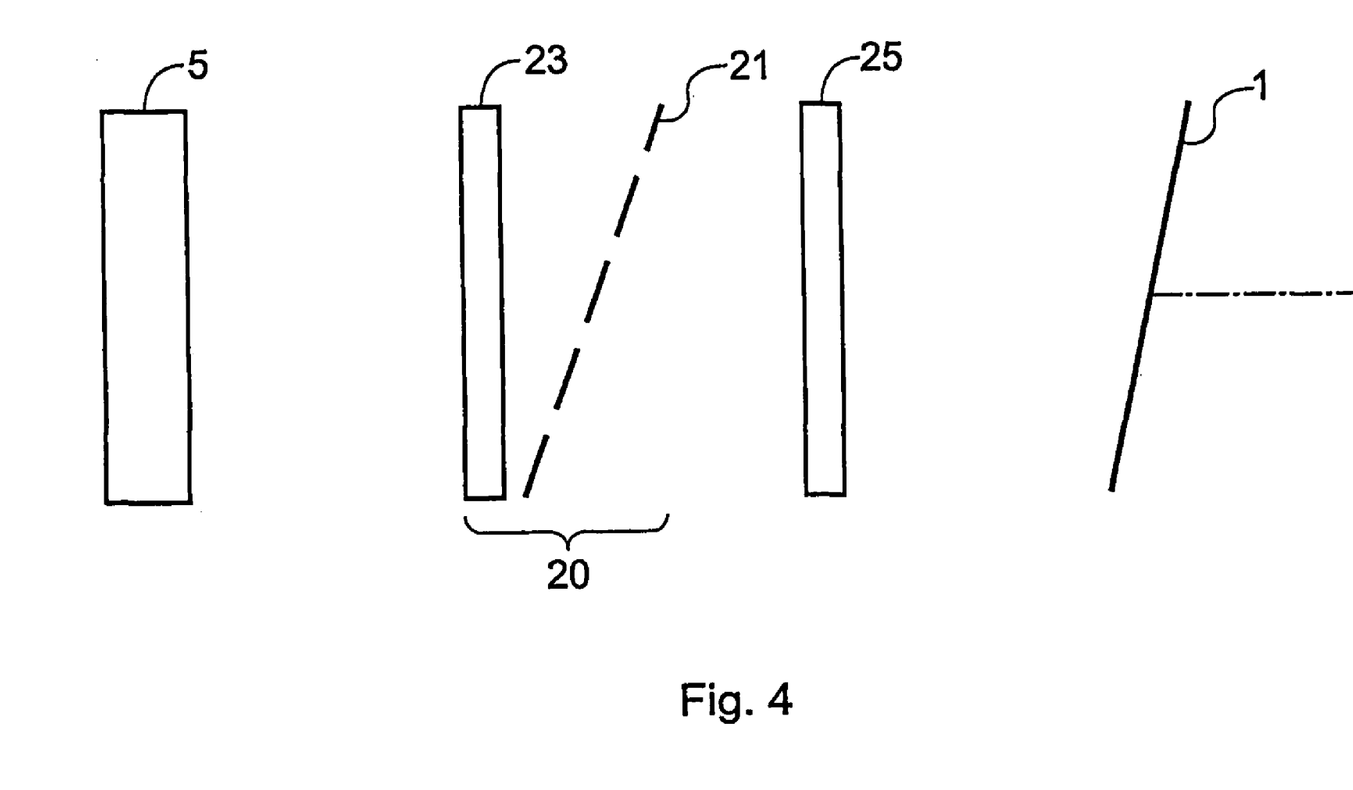
FIG. 4 shows an apparatus according to a further embodiment of the invention.

FIG. 4 shows an alternative embodiment in which the rotating unit 20 consists of a quarter wave 23 plate and a linear polarizer 21. The apparatus also has a Faraday rotator 25, which rotates the plane of polarization by 45°.

In the embodiment shown in FIG. 4, the fixed quarter wave plate 5 converts a linearly polarized beam in to a circularly polarized beam. This circularly polarized beam is received by the rotating unit 20 and is converted into a linear beam by the quarter wave plate 23. The beam then passes through the linear polarizer 21 and is then received by the Faraday rotator 25 which rotates the plane of the polarization of the incident beam by 45°. This beam is then incident at the rotating mirror 1 where it is reflected.

The beam passes back through the Faraday rotator 25 where it undergoes a further rotation of 45° in its plane of polarization.

The beam is now polarized at right angles to the transmission axis of the inclined polarizer 21 of the rotation unit 3. The polarizer 21 therefore reflects the incident beam in a conical scan pattern. This reflected beam now passes through the Faraday rotator 25 again and the plane of polarization is rotated through 45°. The beam is then reflected at the mirror 1, and passes through the Faraday rotator, the plane of polarization being rotated through 45° so that the beam is then able to pass through the inclined polarizer 21 and then through the quarter wave plate 23 of the rotating unit 20.

In this way, there are two reflections at the rotating mirror 1 and one at the inclined polarizer 21, which is positioned at twice the angle of the rotating mirror 1.

Figure 5:
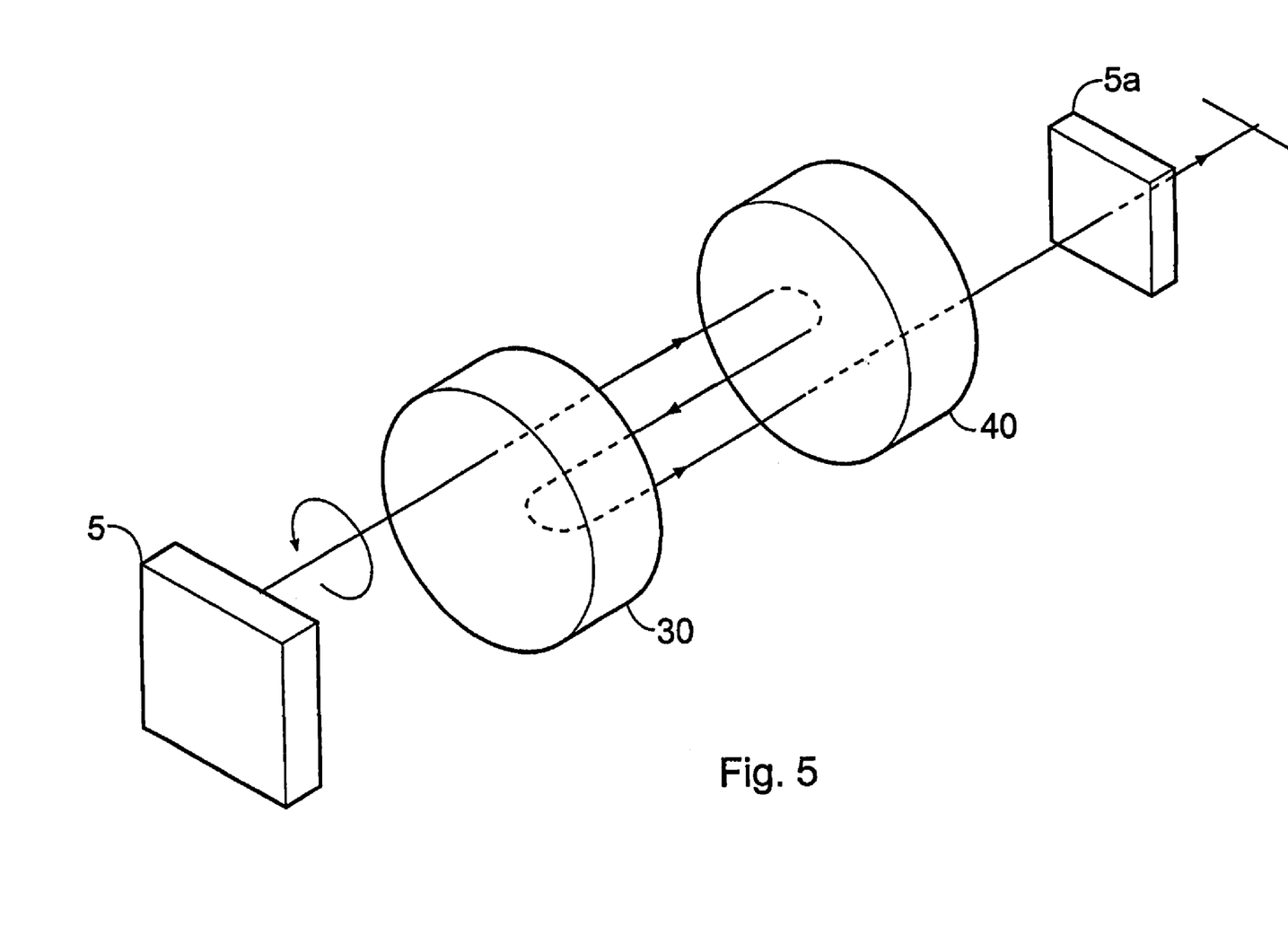
FIG. 5 shows an apparatus according to an embodiment of the invention arranged in transmission.

It is also possible for two rotating units similar to that described in FIG. 1 to be used in series. This arrangement is shown in FIG. 5. The second unit 30 rotates about its axis with the same speed, but in the opposite direction from the first unit 40, and has a Faraday rotator between the quarter wave plate and the polarizer. In this embodiment, it is not necessary to have a rotating mirror, because the polarizer in the second rotating unit 40 can act as a mirror. The beam passes through the first rotating unit 30 as described for the first embodiment. The beam then passes to the second rotating unit 40 and is reflected from the inclined polarizer of the second unit.

The reflection at the inclined polarizer of the second unit rotates the polarization of the beam through 90°, so that when the beam passes back to the first polarizing unit, it is reflected by the inclined polarizer (and the polarization is rotated through 90°).

This time when the beam reaches the second rotating unit 40 it passes through the inclined polarizer and via a second quarter wave plate 5a which is fixed.

Figure 6:
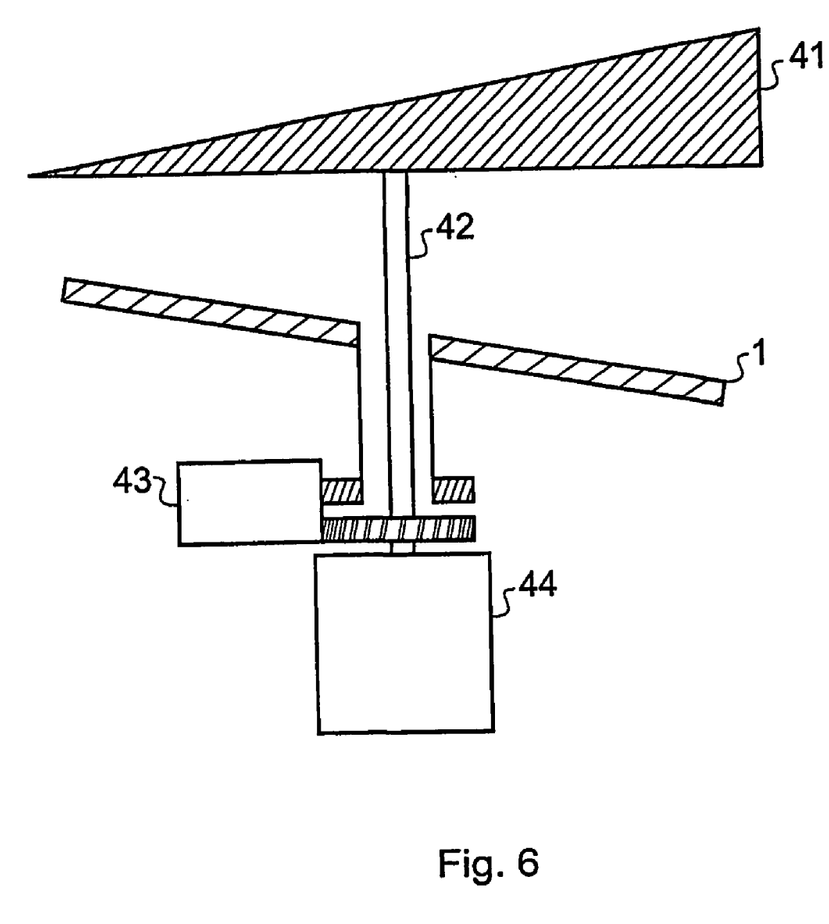
FIG. 6 shows an apparatus according to a further embodiment of the invention.

In an alternative embodiment shown in FIG. 6, the rotating unit is a rotating wedge 41 which rotates in the opposite direction from, and at the same speed as, the rotating mirror 1. The rotating wedge 1 is mounted on a drive shaft 42, and a gear box 43 and a motor 44 are used to control the speed and direction. The rotation is further balanced by balance weights 45a and 45b.

Figure 7:
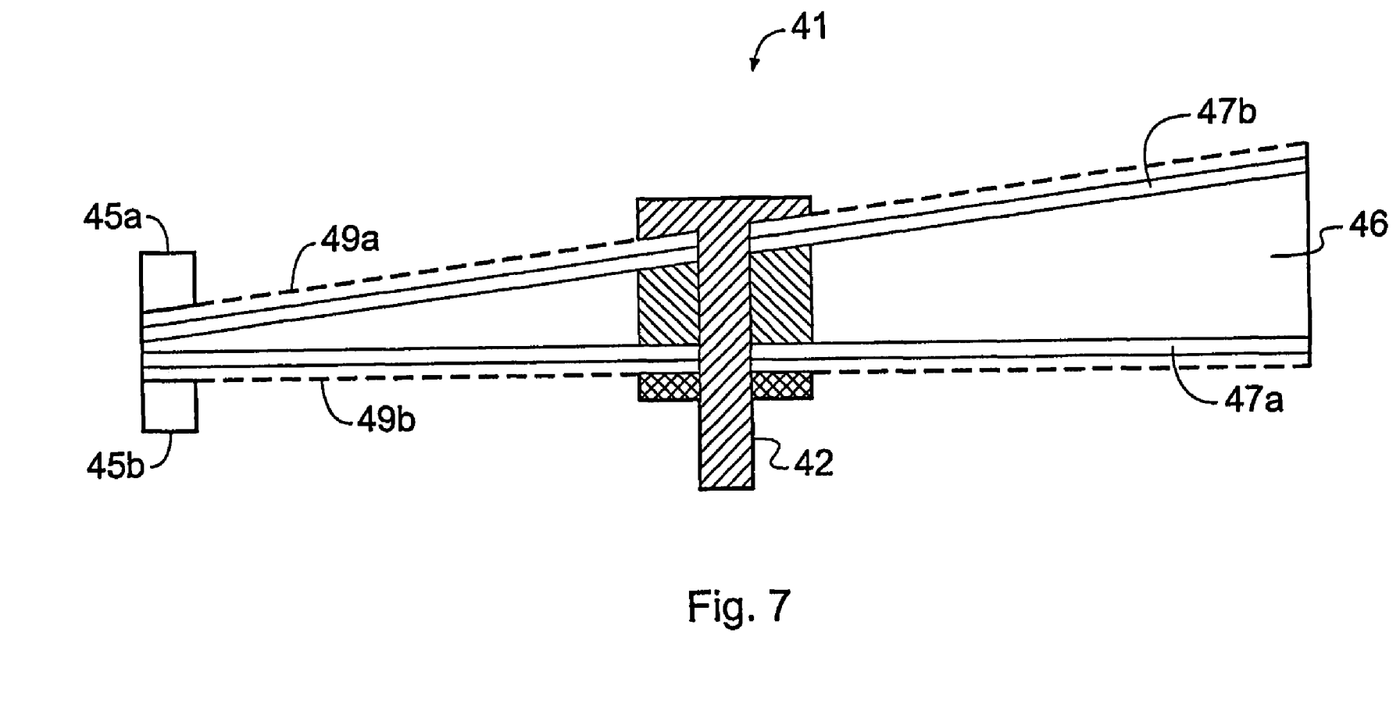
FIG. 7 shows the wedge of FIG. 6 in detail.

FIG. 7 shows the wedge of this embodiment in more detail. The wedge 41 has a sulphur layer 46 sandwiched between two silica plates 47a and 47b, which are coated with anti-reflective PTFE layers 49a and 49b.

At microwave frequencies sulphur has a refractive index of 1.89 which is close to that of silica (1.94).

The silica plates are angled to produce a wedge which will deviate a beam through an angle θ given by:

$$\theta = 2 \sin(n \sin \alpha/2) - \alpha$$

at the condition of the minimum deviation, where α is the apex angle of the wedge. For small deviations, this approximates to:

$$\theta = (n-1)\alpha$$

where n is the refractive index of the wedge.

The anti-reflective layer should have a refractive index which is the square root of the refractive index of the silica and have an optical thickness of λ/4 where λ is the wavelength of the radiation. PTFE is therefore an appropriate material for the anti-reflective layer, as it has a refractive index of 1.44 which approximates to the square root of the refractive index of silica (1.89). Its thickness should be 1.39 mm for radiation having a wavelength of 8 mm (i.e. 35 GHz). Alternative materials and thicknesses can be selected by the person skilled in the art. For example, it may be possible to achieve a suitably refractive wedge using a body of silica material, thus omitting the sulphur.

A beam incident on the arrangement of FIGS. 6 and 7 passes twice through the wedge 46 as it is reflected by the rotating mirror 1.

What is claimed is:

1. A scanning apparatus having a rotatable reflector and a rotatable optical wedge including refractive materials, wherein the wedge and the reflector are arranged to counter-rotate about generally parallel axes, the reflector and the two faces of the wedge being inclined to their respective axes of rotation, such that in use a beam passes through the wedge, is reflected by the reflector and passes back through the wedge to provide a linear scan.

2. A scanning apparatus according to claim 1 wherein the axes of rotation of the wedge and the reflector are coincident.

3. A scanning apparatus according to claim 1 wherein the median plane of the wedge is generally perpendicular to the axis of the wedge's rotation.

4. A scanning apparatus according to claim 1 wherein the wedge comprises refractive plates supported on a refractive core.

* * * * *